May 12, 1931.  E. C. LOETSCHER  1,805,179
VENEER ARTICLE AND METHOD OF MANUFACTURE
Filed Aug. 18, 1928
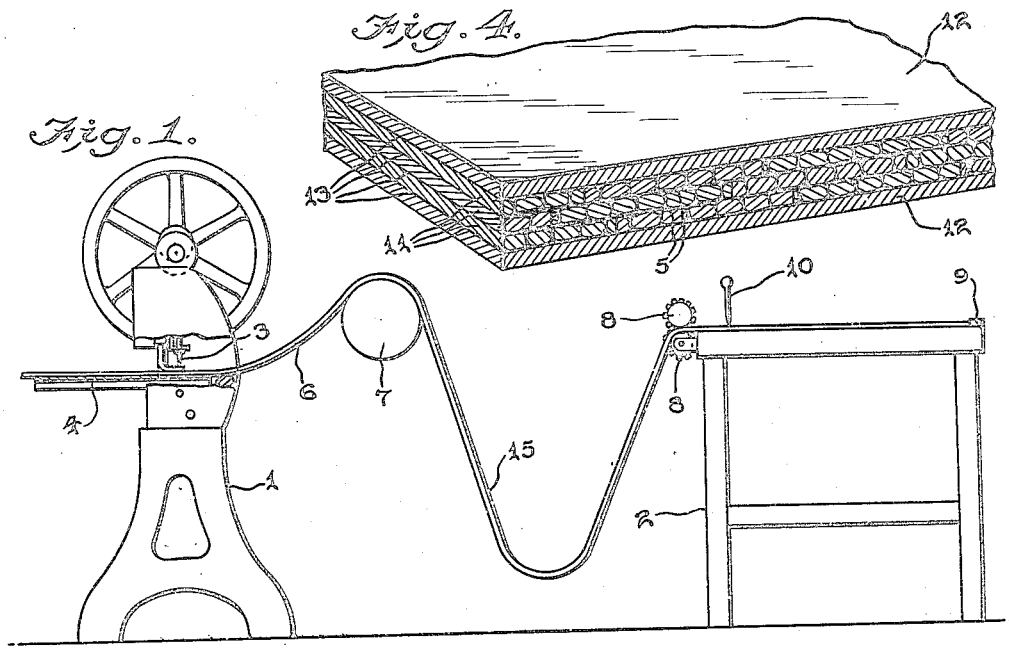
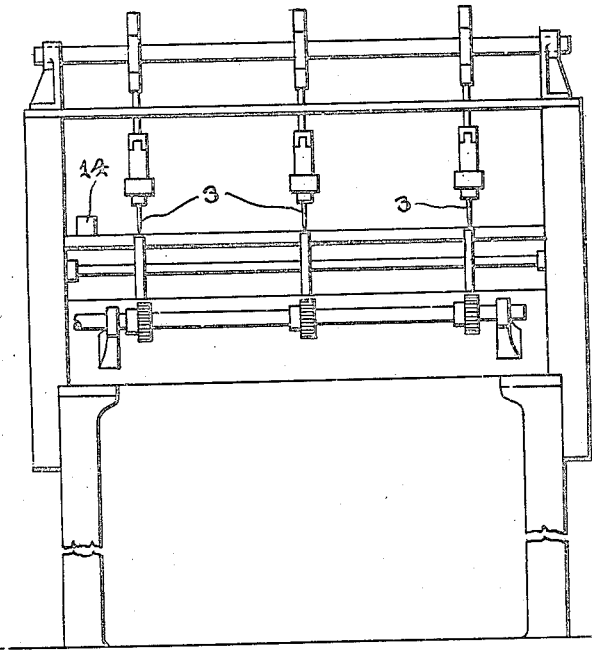
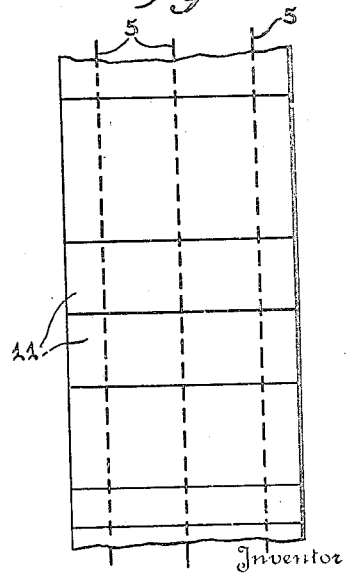
E. C. Loetscher,
By Havell & Havell
Attorneys Patented May 12, 1931

1,805,179

UNITED STATES PATENT OFFICE

EMIL C. LOETSCHER, OF DUBUQUE, IOWA

VENEER ARTICLE AND METHOD OF MANUFACTURE

Application filed August 18, 1928. Serial No. 300,528.

This invention relates to veneers, and more especially to a novel method of manufacturing core stock for veneers.

Heretofore, it has been the general practice in manufacturing core stock, to utilize short lengths of suitable material, such as wood, and to arrange these sections edge to edge, and to join adjacent edges of the pieces together by means of paper tape one inch wide, and provided with adhesive on one side. The pieces are run through what is known as a taping machine which firmly presses the tape against the wood, causing the same to adhere and thus joining the pieces together. The objection to this method is that it is rather slow, and furthermore, that when the core stock is run through a glue spreader, the tape becomes moist, and the pieces are apt to fall apart.

The primary object of the present invention is to provide a method which will eliminate these disadvantages and provide improved core stock which will enable better veneers to be manufactured.

Another object of the invention is to connect the core stock pieces of wood together by a plurality of rows of stitches arranged crosswise of the pieces, or longitudinally of the strip or sheet formed by the sewed pieces.

A further object of the invention is to provide a method of making core stock, in which the pieces are continuously sewed together to form a continuously progressing strip or sheet, which may be automatically and intermittently cut into uniform lengths; these length being superposed and employed as the core of a laminated panel or the like.

A further object is to furnish a novel laminated veneer panel in which the parts more firmly adhere to each other, and in which the core stock pieces are more securely united to one another.

With the foregoing objects outlined and with other objects in view which will appear as the description proceeds, my invention consists in the novel features hereinafter described in detail, illustrated in the accompanying drawings, and more particularly pointed out in the appended claims.

Referring to the drawings,

Fig. 1 is a side view of a suitable apparatus with which my method may be practiced.

Fig. 2 is an enlarged elevation of the sewing machine portion of the apparatus.

Fig. 3 is a plan view of a portion of a core stock strip made in accordance with the invention.

Fig. 4 is a perspective view, partly in vertical section, of a laminated panel forming the product of the invention.

The apparatus employed in my process, consists of two main parts, 1 a suitable sewing machine, and 2, a gauging and cutting table. The sewing machine may be of any construction desired, so long as it has a plurality of needles 3, designed to sew along a plurality of lines, as the core stock material is fed therethrough. In using the machine, short lengths of wood are placed consecutively, and in edge to edge relation on the feed table 4, and as the sewing machine is continuously operating, these pieces will be joined together by a plurality of lines of stitches 5, as indicated in Fig. 3, and as the thread used will be relatively thick and strong, these short lengths of wood will be transformed into a continuous strip 6, which will pass over the guide roller 7, and then be led between feeding rollers 8, on to the table 2. As the strip advances, its forward end will strike a stop or gauge 9 on the table, and at this time, a knife 10, extending across the table, will be lowered to sever the strip and cut off the required length. The severed unit will then be removed, and as the strip continues to advance, its forward end will against strike the gauge 9, and the cutting operation will be repeated, and so on. The units thus formed, will be superposed, as shown at 11 in Fig. 4, and will be joined together, as well as to facing veneers 12, by means of layers of adhesive 13. It will be obvious that the threads forming the stitches, will not interfere with the adherence of one unit to the other.

In case the wood pieces employed in making up the strip 6 are of unequal lengths, a gauge block 14 may be placed on the table of the sewing machine, to enable the operator to align the pieces so that one edge of the strip will be straight. Of course, the opposite edge may be cut by any suitable means, so as to make all of the units 11 of uniform size.

The multiple rows of stitches may be stitched either continuously across the joints, as shown in Fig. 3, or if the core stock is very wide across the grain, it may be preferable to have the stitches begin about two inches to one side of the joint, and end two inches on the other side of the joint, thus saving considerable thread. When, however, the core stock is narrow, say six to eight inches wide, it will be more economical to run the stitches all the way across the pieces, as it would take longer to interrupt the pieces, than to sew in a continuous manner.

My method is considerably more economical than the old method of taping, and much more efficient, because the thread will not allow the pieces to separate when going through the glue spreader. It has the further advantage that the glue has access to the wood at all points. On the other hand, when tape is used, as proposed heretofore, even when perforated, the glue cannot reach the portions of the stock covered by the paper. This disadvantage in the old method, is frequently a source of defective panels, because the joint at the tape is no stronger than the paper itself, and sometimes, the paper spreads or the adhesive loosens, and thus causes the panel to become blistered.

The looped portion 15 of the strip permits the sewing machine to run continuously while the knife 10 works intermittently, and by my method, a very high rate of production may be obtained; considerably greater than with the old method of taping the stock together. In the taping method, at the end of each joint, the tape must be broken, and the material passed back and forth through the machine, causing a delay at each reversal. In the stitching process of the present invention, the operation will be continuous, in regard to sewing, and also practically continuous in the severing process. It may be also stated that in my method all the panels may be cut to a definite length, whereas in the taping method, it is usual to select pieces which will approximately make up the definite length.

From the foregoing, it is believed that the invention may be readily understood by those skilled in the art, and I am aware that various changes may be made in the details disclosed, without departing from the spirit of the invention, as expressed in the claims.

What I claim and desire to secure by Letters Patent is:

1. A laminated veneer panel, including a core formed of superposed units, each unit consisting of a plurality of fibrous strips connected together by sewing thread, layers of adhesive between the units integrally connecting the same together, and a facing strip secured to one of said units by a layer of adhesive.

2. A laminated veneer panel, including facing strips and a core formed of superimposed units, each unit of the core consisting of a plurality of fibrous strips connected together by sewing thread, with adhesive between the fibrous strips of each unit and between the strips of the different units and the facing strips.

3. The method of forming veneer having facing strips and a laminated core, which comprises laying short strips of fibrous material edge to edge in a continuous manner, stitching across the meeting edges of said material to form an elongated strip, cutting the strip transversely to form units, and thereafter applying adhesive to the faces of each unit and uniting the units with facing strips under pressure.

4. The method of forming veneer having facing strips and a laminated core, which comprises laying short strips of fibrous material edge to edge in a continuous manner, stitching across the meeting edges of said material to form an elongated strip, cutting said strip transversely to form units and thereafter applying adhesive to the faces of each unit and superposing them, and uniting the units and facing strips under pressure so that the spaces between the individual strips of adjacent units are in a staggered relation.

In testimony whereof I affix my signature.

EMIL C. LOETSCHER.